United States Patent
Grabarmik et al.

(10) Patent No.: US 7,756,999 B2
(45) Date of Patent: Jul. 13, 2010

(54) METHOD AND SYSTEM FOR ROUTING SERVICE REQUESTS BASED ON THROUGHPUT OF TEAMS OF SERVERS

(75) Inventors: Genady Grabarmik, Scarsdale, NY (US); Dimitri Kanevsky, Ossining, NY (US); Debanjan Saha, Mohegan Lake, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/042,631

(22) Filed: Mar. 5, 2008

(65) Prior Publication Data

US 2009/0228605 A1  Sep. 10, 2009

(51) Int. Cl.
*G06F 15/173* (2006.01)
(52) U.S. Cl. ............ 709/244; 709/238; 709/241
(58) Field of Classification Search ............ 709/244
See application file for complete search history.

(56) References Cited

U.S. PATENT DOCUMENTS

| | | | |
|---|---|---|---|
| 5,101,353 A | 3/1992 | Lupien et al. | |
| 5,881,238 A | 3/1999 | Aman et al. | |
| 6,151,582 A | 11/2000 | Huang et al. | |
| 6,330,326 B1 | 12/2001 | Whitt | |
| 7,130,824 B1 | 10/2006 | Amanat et al. | |
| 7,260,645 B2* | 8/2007 | Bays | 709/238 |
| 2003/0204619 A1* | 10/2003 | Bays | 709/238 |
| 2005/0033858 A1* | 2/2005 | Swildens et al. | 709/232 |

* cited by examiner

*Primary Examiner*—Benjamin R Bruckart
*Assistant Examiner*—Shripal K Khajuria
(74) *Attorney, Agent, or Firm*—Scully, Scott, Murphy & Presser, P.C.; Daniel P. Morris, Esq.

(57) ABSTRACT

A method and system are disclosed for creating portfolios of requests so as to reduce or minimize the variance in the workloads generated by those requests. The invention also takes into account the throughput of the servers that are servicing the requests. In a preferred embodiment, the method comprises the steps of establishing a set of system parameters; using said parameters to generate a model, said model including a defined optimization problem; and solving said optimization problem to output a set of mixing weights. The set of parameters and said mixing weights are used to generate a task; and the service requests are distributed to different service teams according to the generated task. Also, for example, the distributing may be done by distributing requests of type i to team j with weight proportional to $w_{ij}$.

7 Claims, 1 Drawing Sheet

MAIN WORKFLOW

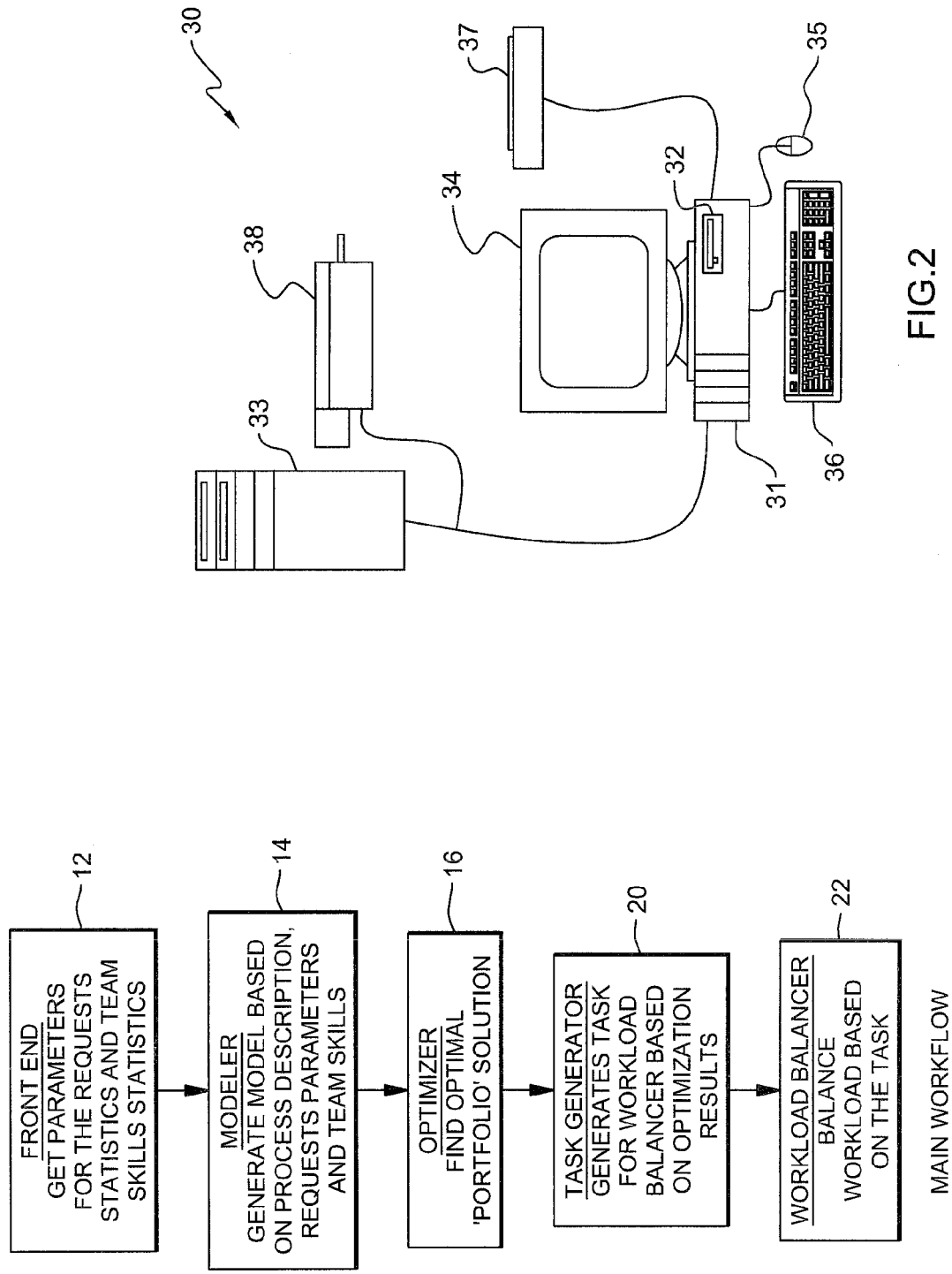

METHOD AND SYSTEM FOR ROUTING SERVICE REQUESTS BASED ON THROUGHPUT OF TEAMS OF SERVERS

BACKGROUND OF THE INVENTION

1. Field of the Invention

This invention generally to routing service requests, and more specifically, the invention relates to methods and systems for organizing and routing service requests in order to reduce the total processing time, or workload, needed to process the requests.

2. Background Art

In many situations or enterprises, a variety of types of requests are processed. For instance, in an enterprise-computing environment, in which data and processing are dispersed over a network of computers, various types of reports are commonly generated. For example, some reports may be generated at regular intervals, such as daily or weekly, to record activities and use of resources of the enterprise. Other reports may be generated when certain specified or defined incidents or events occur. Such reports, referred to as incident reports or incidents, may be generated when certain changes are requested or made or when error or fault or other types of conditions are detected that require the attention of an administrator or that, for other reasons, need to be recorded. These incident reports may be created, for example, by a service desk that services or administers the enterprise, or in a change management database (CMDB).

Also, in telephone call centers or similar service centers, a number of people may call and make requests. These requests may be, for example, for information, for products or for services. A large number of employees may be available at the call center to respond to the requests; and, using one procedure or another, the calls are directed to the call center employees for processing or servicing.

In many enterprises, the requests, such as incidence reports and change requests, are quite inhomogeneous in nature. This creates difficulties in allocating the appropriate task force to the requests, since the processing times for the requests, and hence the associated workloads, will vary significantly.

SUMMARY OF THE INVENTION

An object of this invention is to provide a method and system for organizing and routing service requests with reduced or minimal possible variance.

Another object of the present invention is to create portfolios of the types of incidents, problems and change (IPC) requests with reduced or minimal possible variance.

A further object of the invention is to reduce the variance of request loads, made up of heterogeneous types of requests, made to servers organized in teams, by creating appropriate mixtures of the loads.

These and other objectives are attained with a method and system for organizing and routing a multitude of service requests of a multitude of different types, to a plurality of teams of servers. The method comprises the steps of establishing a set of system parameters; using said parameters to generate a model, said model including a defined optimization problem; and solving said optimization problem to output a set of mixing weights. The set of parameters and said mixing weights are used to generate a task; and the service requests are distributed to different service teams according to the generated task.

The optimization problem is: find values $w_{ij}$ (team i, request j) satisfying the condition:

$$\min \text{sum}_{i=1,l}(\text{sum}_{j=1} w_{ij} sd_j)^2,$$

where:
$w_{ij} >= 0$,
$w_{ij} <= n_{ij}$,
$\text{sum } w_{ij} = N_j$,
and where:
the requests are denoted as $r_1, \ldots, r_k$,
the teams of servers are denoted as $t_1, \ldots, t_l$,
each team i is able to provide throughput $n_{ij}$ for the requests $r_1, \ldots, r_k$,
a load is characterized by counts $N_1, \ldots, N_k$ for the requests $r_1, \ldots, r_k$, and
$sd_j$ is the standard deviation in the distribution of the throughputs of the server teams for processing request j.

Also, for example, the distributing may be done by distributing requests of type i to team j with weight proportional to $w_{ij}$.

Further benefits and advantages of this invention will become apparent from a consideration of the following detailed description, given with reference to the accompanying drawing, which specifies and shows preferred embodiments of the invention.

BRIEF DESCRIPTION OF THE DRAWINGS

FIG. 1 illustrates the major functional components of a preferred embodiment of the invention.

FIG. 2 shows a computing system that may be used to implement the invention.

DETAILED DESCRIPTION OF THE PREFERRED EMBODIMENTS

The present invention, generally, relates to methods and systems for creating portfolios of requests so as to reduce or minimize the variance in the workloads generated by those requests. The invention also takes into account the throughput of the servers that are servicing the requests.

These requests may occur in a number of contexts. For example, as mentioned above, in an enterprise-computing environment, various types of reports are commonly generated. For example, some reports may be generated at regular intervals, such as daily or weekly, to record activities and use of resources of the enterprise. Other reports may be generated when certain specified or defined incidents or events occur. Such reports, referred to as incident reports or incidents, may be generated when certain changes are requested or made or when error or fault or other types of conditions are detected that require the attention of an administrator or that, for other reasons, need to be recorded. These incident reports may be created, for example, by a service desk that services or administers the enterprise, or in a change management database (CMDB).

As another example, in telephone call centers or similar service centers, a number of people may call and make requests. These requests may be, for example, for information, for products or for services. A large number of employees may be available at the call center to respond to the requests; and, using one procedure or another, the calls are directed to the call center employees for processing or servicing.

The present invention provides a mechanism for organizing these service requests and for allocating the request to an appropriate task force.

FIG. 1 shows then workflow for the system implementing the preferred embodiment of the invention. There are five components involved in main workflow: a Front End Component 12, a Modeler 14; an Optimizer 16; a Task Generator 20; and a Workload Balancer 22.

Front End component 12 is responsible for setting up parameters of the system. Parameter of the system are, but not restricted to, types of requests, distribution of the requests throughput by type of request, and the service teams throughput by type of the request. As alternative source of the parameters for the system, model building can be used, as described in U.S. Pat. No. 6,330,326 for "Dynamic Staffing of Service Centers to Provide Substantially Zero-Delay Service".

Modeler component 14 uses the parameters that are set up by the Front End component to generate a model for the Optimizer component 16. Optimizer component 16 solves the associated optimization problem and outputs necessary mixing weights. Task Generator 20 uses these mixing weights and the set up parameters of the system to generate a task for the Workload Balancer component 22. The goal of the Workload Balancer is to distribute requests to the different service teams according to the task generated by task generator.

Discussed below are parameters that may be used to describe a model.

One type of the parameters are requests related parameters. The requests can be described as having k different types, denoted by $r_1, \ldots, r_k$. Each type of request has its own distribution of time between requests.

Another type of parameters are process related parameters; for each type of request, the distribution of the throughput is established and the average and standard deviations are calculated. These values may be denoted by $m_i$ and $sd_i$ respectively, where i changes from 1 to k. Method of evaluation of the statistical throughput characteristics may, for example, be taken from the appropriate statistical literature or from U.S. Pat. No. 6,330,326.

The next types of the parameters are parameters that characterize the server team throughput for each type of request. More precisely, consider that teams $t_1, \ldots t_l$ of the servers are provided, and team $t_i$ is able to provide throughput $n_{i,j}$ for the requests of type $r_j$. The method can be illustrated for the case when throughputs are independent, and there is no setup time between requests of different types. However, the method remains applicable also for the case of dependant throughputs and when there is some fixed preparation time $p_{j,1}$ between requests of type j and 1.

Consider that a load is characterized by counts $N_1, \ldots, N_k$ for the requests $r_1, \ldots, r_k$. Model parameters, given in appropriate format (for instance, an xml based description), are set by the Modeler and are passed to the Optimizer. The Optimizer using parameters provided by the Modeler creates the following optimization problem:

Find values of $w_{i,j}$ (team i, request j) satisfying $$\min \text{sum}_{i=1,l}(\text{sum}_{j=1,k} w_{i,j} sd_j)^2$$

Subject to
$w_{i,j} >= 0$
$w_{i,j} <= n_{i,j}$
sum $w_{i,j} = N_j$

This is a convex (quadratic) problem and may be solved by standard solvers, provided by IBM or ILOG or others.

The resulting solution containing weights $w_{i,j}$ is passed to the Workload Balancer in the appropriate format. The Workload Balancer distributes requests of type i to team j with weight proportional to the $w_{i,j}$.

As an example, in an enterprise-computing environment, the processing times for Lotus Notes requests have a mean of seven days and a variance of five days. Also, the processing times for Change Password requests have a mean of one hour with a variance of one hour. In order to fill in gaps in Louts Notes processing, short Change Password requests can be used, so that gaps in Lotus Notes request processing are filled with short Change Password requests. This will decrease wait time between requests.

The preferred embodiment of the invention, described above in detail, provides a number of important advantages. For example, this embodiment of the invention allows the variability in workload to be reduced, and allows for a better scheduling of work. In addition, the invention allows for a reduction in the wait time between requests, and allows the useful workload to be increased.

As will be understood by those of ordinary skill in the art, the present invention may be practiced in a number of specific applications or environments. Also, the server teams to which the requests are routed may be people or computers, or other suitable devices.

The method of the present invention will be generally implemented by a computer executing a sequence of program instructions for carrying out the steps of the method and may be embodied in a computer program product comprising media storing the program instructions. Referring to FIG. 2, a computer system 30 is depicted on which the method of the present invention may be carried out. Processing unit 31, houses a processor, memory and other systems components that implement a general purpose processing system that may execute a computer program product comprising media, for example a floppy disc that may be read by processing unit 31 through floppy drive 32.

The program product may also be stored on hard disk drives within processing unit 31 or may be located on a remote system 33 such as a server, coupled to processing unit 31, via a network interface, such as an Ethernet interface. Monitor 34, mouse 35 and keyboard 36 are coupled to processing unit 31, to provide user interaction. Scanner 37 and printer 38 are provided for document input and output. Printer 38 is shown coupled to processing unit via a network connection, but may be coupled directly to processing unit 31. Scanner 37 is shown coupled to processing unit 31 directly, but it should be understood that peripherals may be network coupled or direct coupled without affecting the ability of workstation computer 30 to perform the method of the invention.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (D) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of organizing and routing a multitude of service requests of a multitude of different types, to a plurality of teams of servers, the method comprising the steps of:

establishing a set of system parameters;

using said parameters to generate a model, said model including a defined optimization problem with the goal of finding teams of servers that optimizes variance of total processing;

solving said optimization problem to output a set of mixing weights;

using said set of parameters and said mixing weights to generate a task; and distributing the service requests to different service teams according to the generated task, wherein the optimization problem is:

find values $w_{ij}$ (team i, request j) satisfying the condition:

$$\min \mathrm{sum}_{i=1,l}(\mathrm{sum}_{j=1} w_{ij} sd_j)^2,$$

where:
$w_{ij} >= 0$,
$w_{ij} <= n_{ij}$,
$\mathrm{sum}\, w_{ij} = N_j$, and where: the requests are denoted as $r_1, \ldots, r_k$, the teams of servers are denoted as $t_1, \ldots, t_l$, each team i is able to provide throughput $n_{ij}$ for the requests $r_1, \ldots, r_k$, a load is characterized by counts $N_1, \ldots, N_k$ for the requests $r_1, \ldots, r_k$, and $sd_j$ is the standard deviation in the distribution of the throughputs of the server teams for processing request j.

2. A method according to claim 1, wherein the distribution step includes the step of distributing requests of type i to team j with weight proportional to wij.

3. A method according to claim 2, wherein the routing of the service requests based on throughput of the teams of servers provides near zero variance in the workload.

4. A method according to claim 2, wherein the routing of the service requests provides workload with minimal possible variance for a given IPC management team.

5. A method according to claim 2, wherein the distributing step includes the step of building portfolios of the queues of the requests with minimal processing variance.

6. A system for organizing and routing a multitude of service requests of a multitude of different types, to a plurality of teams of servers, the system comprising:

a front-end component for establishing a set of system parameters;

a modeler for using said parameters to generate a model, said model including a defined optimization problem with the goal of finding teams of servers that optimizes variance of total processing;

an optimizer for solving said optimization problem to output a set of mixing weights;

a task generator for using said set of parameters and said mixing weights to generate a task; and a workload balancer for distributing the service requests to different service teams according to the generated task;

wherein the optimization problem is:

find values $w_{ij}$ (team i, request j) satisfying the condition:

$$\min \mathrm{sum}_{i=1,l}(\mathrm{sum}_{j=1} w_{ij} sd_j)^2,$$

where:
$w_{ij} >= 0$,
$w_{ij} <= n_{ij}$,
$\mathrm{sum}\, w_{ij} = N_j$, and where: the requests are denoted as $r_1, \ldots, r_k$, the teams of servers are denoted as $t_1, \ldots, t_l$, each team i is able to provide throughput $n_{ij}$ for the requests $r_1, \ldots, r_k$, a load is characterized by counts $N_1, \ldots, N_k$ for the requests $r_1 \ldots, r_k$, and $sd_j$ is the standard deviation in the distribution of the throughputs of the server teams for processing request j.

7. A system according to claim 6, wherein the workload balancer distributes requests of type i to team j with weight proportional to $w_{ij}$.

* * * * *